Dec. 20, 1960  B. LIEBOWITZ  2,964,756
ANTICURL DEVICES
Filed Nov. 26, 1958  7 Sheets-Sheet 1

INVENTOR
Benjamin Liebowitz
BY Michael S. Striker
his ATTORNEY

Dec. 20, 1960    B. LIEBOWITZ    2,964,756
ANTICURL DEVICES

Filed Nov. 26, 1958    7 Sheets-Sheet 2

INVENTOR
Benjamin Liebowitz
BY Michael S. Striker
his ATTORNEY

Dec. 20, 1960  B. LIEBOWITZ  2,964,756
ANTICURL DEVICES

Filed Nov. 26, 1958  7 Sheets-Sheet 3

INVENTOR
Benjamin Liebowitz
BY Michael S. Striker
his ATTORNEY

Dec. 20, 1960  B. LIEBOWITZ  2,964,756
ANTICURL DEVICES
Filed Nov. 26, 1958  7 Sheets-Sheet 4

INVENTOR
Benjamin Liebowitz
BY Michael S. Striker
his ATTORNEY

Dec. 20, 1960     B. LIEBOWITZ     2,964,756
ANTICURL DEVICES Filed Nov. 26, 1958     7 Sheets-Sheet 5

INVENTOR.
Benjamin Liebowitz
BY Michael S. Striker
his ATTORNEY

Dec. 20, 1960

B. LIEBOWITZ

2,964,756

ANTICURL DEVICES

Filed Nov. 26, 1958

INVENTOR.
Benjamin Liebowitz
BY Michael S Striker his ATTORNEY

Dec. 20, 1960        B. LIEBOWITZ        2,964,756
ANTICURL DEVICES Filed Nov. 26, 1958        7 Sheets-Sheet 7

INVENTOR.
Benjamin Liebowitz
BY
*Michael S. Striker*
his ATTORNEY

2,964,756

ANTICURL DEVICES

Benjamin Liebowitz, Lewisboro, N.Y., assignor to Endsdown Company, New York, N.Y.

Filed Nov. 26, 1958, Ser. No. 776,627

5 Claims. (Cl. 2—132)

The present invention relates to means for preventing undesired curvature of garment parts such as men's and boy's shirt collars.

The present application is a continuation-in-part of copending application Serial No. 719,841, filed March 7, 1958, now abandoned and entitled "Anticurl Devices for Garments"; application Serial No. 719,841, filed March 7, 1958, being in turn a continuation-in-part of application Serial No. 685,511, filed September 23, 1957, now abandoned and entitled "Anticurl Device"; which application Serial No. 685,511, filed September 23, 1957 is in turn a continuation-in-part of application Serial No. 640,507, filed February 15, 1957, now abandoned and entitled "Longitudinally Folded Anticurl Device."

A primary object of the present invention is to provide a non-removable device of this type which will withstand both laundering and drycleaning and which is relatively stiff and low in cost.

Another object of the present invention is to make an anticurl device of this type from a plastic which is very thin and which at the same time has the desired stiffness, because a thiner plastic is less vulnerable to accidents during washing, drycleaning, or pressing.

A further object of the present invention is to provide an anticurl device which will have its own curvature and which will therefore induce a curving tendency in a portion of an article of apparel with which the anticurl device is assembled, such an article of wearing apparel being, for example, a shirt, a girdle, a brassiere, or the like.

Non-removable anticurl devices are shown in U.S. Patent Nos. 2,601,035, 2,601,036 and Reissue No. 23,617, in which a stretched elastomer is attached by stitching to a thin compression-resistant plastic strip. Devices of this latter type, which may be referred to as "composite," have proved very satisfactory technically and commercially, but they cannot be drycleaned very safely and their cost is relatively high. Moreover, even though these devices are made of a very suitable plastic called Mylar, nevertheless embrittlement of the plastic may occur under certain abusive laundering conditions, and such an embrittlement sometimes leads to breakage of said plastic strip. In the case of a composite anticurl device, such breakage, if it should occur, is not too serious because the rubber strip holds the parts together so that the compressive resistant function of the plastic strip in resisting the pull of the rubber is not so impaired by the breakage as to seriously prevent the composite strip from inducing its intended anticurl forces. Moreover, the presence of the rubber exerts some cushioning effect in ironing so that it may reduce the chances of such breakage. But in the all-plastic strip of this invention the advantages arising from the presence of the rubber are not available so that other means are used for preventing or inhibiting hydrolysis and consequent embrittlement and likelihood of breakage, as will be discussed below. In this present invention one of the advantages gained is to make the anticurl device drycleanable by elimination of the rubber. Another important advantage is reduction in over-all cost of production. Still another advantage is to reduce the vulnerability to abusive laundering processes. These and other advantages are gained by my discovery that a very thin strip of compression-and-extension-resistant plastic material can have its flexural stiffness surprisingly increased by folding lengthwise so as to create a beam or channel effect and that the stiffness thus attained is sufficient for all practical purposes even though the plastic is only 0.005 inch thick, more or less, and that this folded structure, despite the weakening effect which would be expected at the fold, resists laundering abuses better than a single layer of thicker plastic.

In composite anticurl devices of the type referred to above, the plastic currently used is Mylar having a thickness of 10-mils and a width of about ¼". This plastic is also used in a somewhat greater width without a stretched elastomer, but the plastic by itself does not possess very much stiffness and therefore must be made substantially wider than ¼" in order to have any effectiveness. Even then, its effectiveness is restricted to short point collars.

Mylar is the commercial name for the material disclosed in U.S. Patent 2,465,319.

Experiments have proved that a properly made anticurl device which is folded lengthwise so as to create a channel effect, in accordance with the present invention, and made of Mylar only 5-mils thick, will have considerably greater stiffness than a single thickness or layer of plastic 10-mils thick. Such a longitudinally folded plastic strip will resist bending very satisfactorily and if the bending forces become excessive it will yield elastically and then spring back promptly when the bending forces are removed. The behavior of the anticurl device of the present invention in this respect is quite remarkable.

It has been found that the increase in stiffness obtained by folding the plastic strip creates the possibility of wear through the back ply of the collar at the upper end of the stay, near the collar band, due to the many hundreds of repeated flexings which take place in repeated washings in the wash wheel. An object of the present invention is to eliminate this tendency to wear through the back ply of the collar. The elimination of the tendency to wear is accomplished according to the present invention by reducing the stiffness of the stay at its upper end, which is to say, the end adjacent the collar band. This reduction in stiffness is brought about in a very simple way, namely, by cutting away or slitting the folded part of the anticurl device at its upper end portion for a distance of approximately ⅜ inch, so that the stay has at its upper end portion a pair of completely unconnected and thus separate thin layers of plastic whose stiffness is far less than the stiffness of the stay in the region where its layers are connected together at the fold. Actual experience with such stays proves that they function in the manner here described so as to provide the stiffness necessary to prevent curling of the collar and at the same time to eliminate any observable tendency of the collar to wear through its bottom ply at the region of the upper end of the stay.

The same considerations apply to the point region of the collar top where the bottom end of the stay has a tendency to wear through the back ply of the collar and/or cause the collar point to fray. Thus, the bottom end of the stay may have the folded portion thereof cut away or slitted so as to eliminate the fold at the bottom end portion of the stay and thus reduce the stiffness of the stay at its bottom end portion so as to eliminate any observable tendency for the collar to become worn through at its bottom ply in the point region of the collar top, and to minimize fraying of the point.

It is also an object of the present invention to provide a means reliably connecting the stay with a garment part such as shirt collar so that the stay is maintained in the desired position while at the same time being free to flex without encountering resistance to flexing as a result of the connection of the stay with the garment, and this means is also capable of preventing the parts of a stay which happens to break from wandering away from each other.

The objects of the present invention also include the provision of a stay having desired curvature characteristics, and, at the same time a satisfactory degree of permanence so that it will continue substantially to maintain its curvature throughout the life of the garment part with which it is then eventually associated.

The invention will be better understood with reference to the following figures in which.

Figure 1:
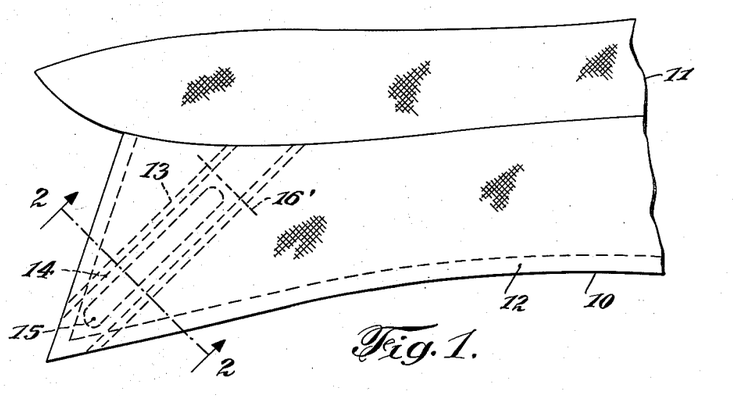
Fig. 1 is a bottom plan view of a soft collar of a man's shirt showing the stay of the present invention in position in the finished collar.
Figure 2:
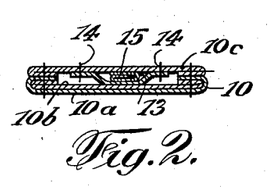
Fig. 2 is a sectional view taken along the line 2—2 of Fig. 1.

Referring to Fig. 1, the collartop 10 is shown connected to a collarband 11, as is conventional. The collartop 10, as is shown in Fig. 2, includes the top ply 10a, the lining 10b and the bottom ply 10c. The collartop 10 is usually stitched along the edge 12, as shown in Fig. 1. A pocket 13 is provided as shown in Figs. 1 and 2, and this pocket has no entrance except through the edge of the collartop 10 before this edge is attached to the band 11, so that after the collartop 10 and band 11 are joined together the pocket 13 is permanently closed and a stay therein is non-removable. The stay is shown in the pocket 13 in Fig. 1 and is indicated in cross section in Fig. 2. This stay is illustrated by itself in a plan view in Fig. 3 and in a transverse cross sectional view in Fig. 4.

Figure 3:
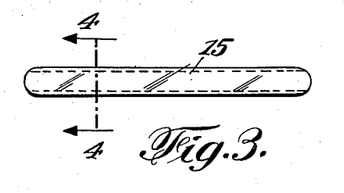
Fig. 3 is a plan view of a preferred embodiment of a stay according to the present invention.
Figure 4:
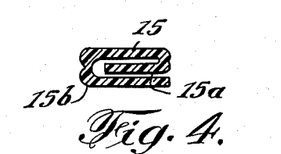
Fig. 4 is a transverse sectional view taken along the line 4—4 of Fig. 3.
Figure 5:
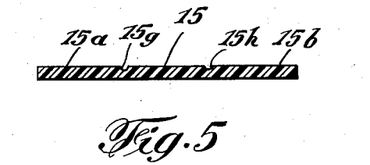
Fig. 5 is a transverse sectional view of an elongated strip used to make the anticurl device of Figs. 3 and 4 before it is folded.

Figs. 3 and 4 show a preferred embodiment in which a strip of Mylar about 0.005″ thick is used to make the anticurl device, and the finished width thereof is approximately ¼″. Before the plastic is folded to form the anticurl device shown in Figs. 3 and 4, it is cut into an elongated strip shown in Fig. 5 in transverse sectional view and having a width of approximately 11/16″, so that the side edge portions or flaps or wings 15a and 15b are each slightly less than ¼″ wide on either side of the intermediate longitudinal portion of the strip. The side edge portions 15a and 15b or wings ar folded as, for example, by means of a suitable folding device, and then they are pressed flat between rollers so as to form the folded structure indicated in Figs. 3 and 4. In order to facilitate folding and to reduce any tendency to unfold, grooves 15g and 15h may be formed in one face of the strip, as shown in Fig. 5, before folding. For example, where the plastic strip 15 shown in Fig. 5 has a thickness of 0.005″, the grooves may each have a depth of approximately 0.0002″.

While Mylar having a thickness of approximately 5-mils has been mentioned above, Mylar of 3-mils thickness has been used very successfully with lightweight fabrics. On the other hand, if a stiffness greater than that provided by 5-mil plastic is desired, a 7½–10 mil or even slightly thicker plastic may be used very satisfactorily. Also instead of using Mylar as a substantially non-stretchable plastic material, nylon in a thickness of between 5 and 10 mils, approximately, is suitable, although nylon softens in laundering and therefore may come from the washwheel in a bent or distorted shape, and if dried in that shape, as in a modern tumbling drier, will be difficult to straighten out afterwards. In this latter case, however, the relative thinness of the plastic substantially reduces the difficulty of straightening if distortion should occur. Thus, the anti-curl device of the present invention may be made from a plastic material selected from the group consisting of Mylar-type and nylon-type substances.

Figure 6:
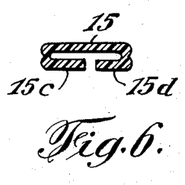
Figs. 6–8 respectively are transverse sectional views of additional embodiments of anticurl devices according to the present invention.

While Fig. 4 shows in cross section a preferred embodiment of the invention, Fig. 6 shows another embodiment where the side edge portions or wings 15c and 15d are slightly less than half the width of the longitudinal intermediate portion, so that when the strip is folded it takes the configuration illustrated in Fig. 6. It should be noted however, that in connection with the embodiment of Figs. 3 and 4, the stay should also have a snug fit in the pocket. For example, if the stay is precisely ¼″ wide, the distance between the side stitches 14 of the pocket (Figs. 1 and 2) should be about 9/32″.

Figure 7:
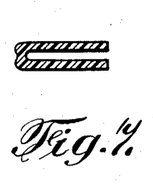
Figures 8, 9:
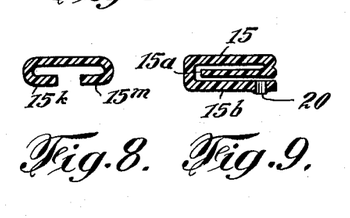
Fig. 9 shows in a transverse cross sectional view a modification of the anticurl device of Figs. 3 and 4.

The embodiment shown in Fig. 7 has only a single fold providing overlapping portions of equal width, while Fig. 8 shows an embodiment where the side edge portions or wings are very narrow. For example, if the intermediate longitudinal portion of the stay of Fig. 8 is precisely ¼″, then the side edge portions 15k and 15m of Fig. 8 may each have a width of 9/64″ or 1/16″, while with the embodiment of Fig. 6 if the intermediate longitudinal portion is precisely ¼″ wide the side edge portions 15c and 15d may each have a width of 7/64″.

It will be noted from Fig. 7 that the overlying strip portions are integrally connected together along the fold line; it will further be noted that the adjacent faces of the strip portions are shown slightly spaced (diagrammatically and not to scale) from each other at least in the region of the fold.

If it is desired to fix stays of the above type in the pocket, it is possible to run a stitch 16 (shown in Fig. 1) across the pocket. The stitch 16 adds appreciably to the cost of manufacture and does not reduce the possibility of the stay poking through the end of the collar during the laundering process. Another means for fixing the stay is to form a row of holes in the plastic strip punched so as to create burrs which, when the collar is first pressed in the manufacturing plant, will engage and interlock with the fabric of the pocket so as to prevent shifting. Fig. 9 shows in cross section one of these punched openings which provides the burr 20. Such burrs can be formed by running the plastic strip through a sewing machine without any thread in it so as to have the needle penetrate at intervals of ⅛″ or so, thereby providing a row of holes with burrs to interlock with the fabric of the pocket.

Figure 10:
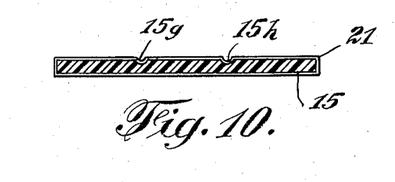
Fig. 10 shows the strip of Fig. 5 provided with a protective coating.

Under normal laundering conditions, either at home or in commercial laundries, Mylar and nylon have usually proved to be capable of withstanding normal laundering treatment without damage, except for the possibility in the case of nylon of drying in a deformed condition, as mentioned above, and except for the possibility of occasional hydrolysis (and embrittlement) as also mentioned above. Under such normal laundering conditions the collars are ironed either by hand (as at home) or in a press where they will remain for a period of 20–25 seconds, approximately. However, some laundries have the practice of allowing the collar to remain in a hot-press a minute, more or less. Under these conditions hydrolysis of Mylar may take place much earlier, and earlier embrittlement results. The thinner plastic used in the stay of the present invention is of great advantage in reducing the consequences of such embrittlement. Furthermore, the thinner plastic shows more resistance to hydrolysis; however, still further protection can be obtained against such embrittlement by a thin coating of a silicone product which adheres to the plastic to form a water-repellant film thereon. Of course, this film is most effective if the silicone coating is properly cured, but some curing will take place even at relatively low temperatures due simply to the passage of time. In Fig. 10 the strip of Fig. 5 is shown in cross section coated with such a film 21. This film may have a thickness on the order of 0.0001″, but in the case of materials such as silicone rubber, for example, much thicker films may be used.

Figure 11:
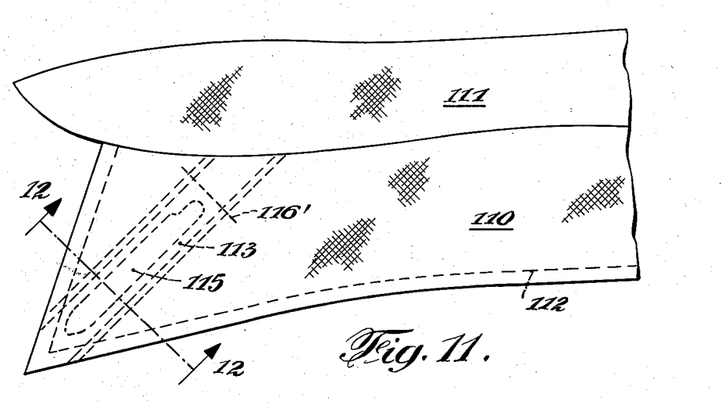
Fig. 11 is a bottom plan view of a soft collar of a man's shirt showing a stay of the present invention in position in the finished collar.
Figure 12:
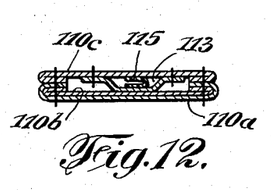
Fig. 12 is a sectional view taken along line 12—12 of Fig. 11 in the direction of the arrows.

Referring now to Figs. 11 and 12, the collar top 110 is shown in Fig. 11 connected to a collar band 111 in a conventional way. The collar top 110 includes, as shown in Fig. 12, top ply 110a, lining ply 110b, and bottom ply 110c. The collar top 110 is usually stitched along the edge 112, as indicated in Fig. 11. A pocket 113 is provided as shown in Figs. 11 and 12, and this pocket has no entrance except through the edge of the collar top 110 before it is attached to the band 111, so that the pocket 113 is closed by joining of the collar top 110 to the band 111 and thus an anticurl device located in the pocket 113 before joining of the collar top 110 to the band 111 is non-removable after the collar top and collar band are connected together. The anticurl device 115 is shown in the pocket 113 in Fig. 11, Fig. 11 also showing a transverse stitch 116′ extending transversely across the pocket 113 to prevent shifting of the anticurl device in the pocket. However, this stitch 116 may be eliminated and longitudinal shifting of the anticurl device is prevented in other ways, as described in the above-identified application. The anticurl device 115 is shown in cross section in Fig. 12, and one embodiment of such an anticurl device is illustrated in Figs. 13–16.

Figure 13:
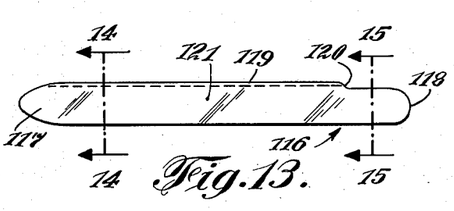
Fig. 13 is a plan view of an anticurl device according to the present invention.

Referring to Fig 13, the anticurl device 116 shown therein has a point end portion 117 and an upper end portion 118. The anticurl device 115 is made of a longitudinally folded plastic strip, and the overlying layers which are provided by folding the strip along its central longitudinal line are connected together at the fold 119. This fold 119 is cut away for a distance of ¼ or ⅜ inch, more or less, from the end 118 to the point 120, and thus there is no stiffening resulting from the fold 119 in the region extending from the point 120 to the extremity of the end portion 118. Another way to eliminate the stiffening effect of the fold at this region is to slit the fold 119 from the end 118 of the anticurl device 115 to the point 120.

Figures 14, 15:
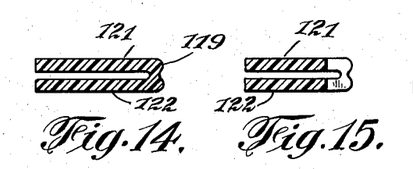
Fig. 14 is a transverse sectional view taken along line 14—14 of Fig. 13.
Fig. 15 is a transverse sectional view taken along line 15—15 of Fig. 13.

Likewise, the point end 117 of the anticurl device 115 may be made more flexible by the approximately bullet-tip shape, and at this point end portion 117 the fold 119 is out away for a distance depending on the particular shape adopted. Fig. 14 shows a cross section of the anticurl device 115 at a region where the fold 119 is not cut away or slit, while Fig. 15 shows a cross section where the fold 119 has been cut away. From Figs. 14 and 15 it is evident that the anticurl device 115 is made of a single piece of plastic folded longitudinally, in the case of Figs. 13–15, down the middle, so as to form a layer 121 and another layer 122 overlying each other and connected together by the fold 119.

Figure 16:
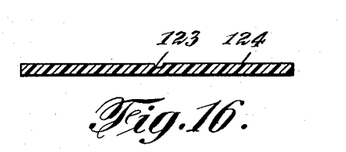
Fig. 16 is a transverse sectional view of an elongated plastic strip used to make the anticurl device of Figs. 13–15, the strip being shown in Fig. 16 before it is folded.

Actually an anticurl device as shown in Figs. 13–15 may be stiffer than desired, even if made of Mylar of a thickness of only 0.005 inch. This stiffness may be controlled, however, by providing a groove in the plastic, as indicated at 123 in Fig. 16, where the plastic strip 124 is shown before it is folded to form the anticurl device 115. The groove 123 extends along the eventual line of the fold 119. Experimentally, it has been found that with 5 mil. Mylar, a groove of 0.001 inch—0.002 inch deep gives the desired results. It is also possible to make the groove 0.003 inch and almost 0.004 inch deep. It will be understood that the strip which is shown in a transverse sectional view in Fig. 16 is folded so as to produce the form shown in Fig. 14. The cutting away or slitting of the fold in the region between the point 120 and the extremity of end portion 118 of Fig. 13 may be performed either before or after folding of the strip 124.

Figure 17:
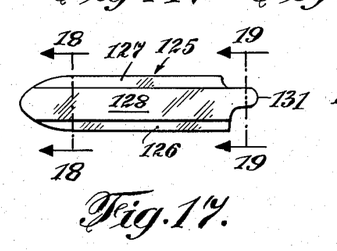
Fig. 17 is a plan view of another embodiment of an anticurl device according to the present invention.
Figure 18:
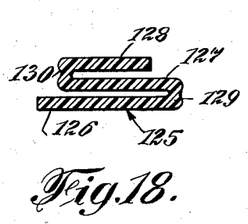
Fig. 18 is a transverse sectional view taken along line 18—18 of Fig. 17.
Figure 19:
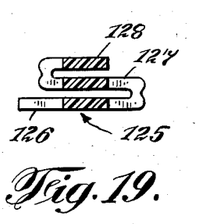
Fig. 19 is a transverse sectional view taken along line 19—19 of Fig. 17.

As an illustration of some of the many variations of the present invention, an embodiment is shown in Figs. 17–19 wherein the folded anticurl device includes three overlying layers 126, 127, 128, the anticurl device 125 being shown in a plan view in Fig. 17. In this embodiment the layer 126 is wider than the layer 127, and the latter layer is wider than the layer 128, as is particularly evident from Fig. 18, which is a transverse cross section taken in a region where the folds 129 and 130 are not cut away. Fig. 19 shows in section the anticurl device 125 at the region of its upper end portion 131 where the folds 129 and 130 are cut away, and as is evident from Fig. 19 at this region the anticurl device has three overlying end portions which are completely unconnected and thus separate from each other to reduce the stiffness of the anticurl device at its end portion 131. Similarly, the stiffness of the anticurl device at its point end portion is reduced by the shaping of the point end portion of the anticurl device. As was the case with the embodiment of Figs. 13–15, the folds 129 and 130 may be either cut away or slit in the region of the end portion 131 of the anticurl device.

Figure 20:
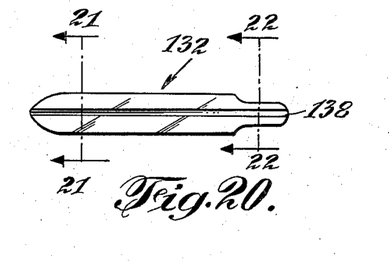
Fig. 20 is a plan view of still another embodiment of an anticurl device according to the present invention.
Figure 21:
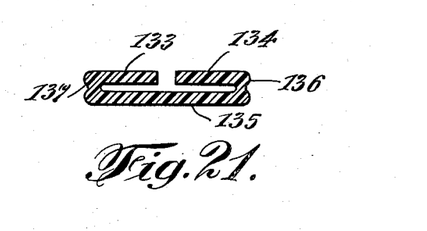
Fig. 21 is a transverse sectional view taken along line 21—21 of Fig. 20.
Figure 22:
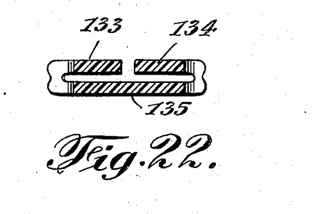
Fig. 22 is a transverse sectional view taken along line 22—22 of Fig. 20.

As an illustration of still another type of anticurl device in accordance with the present invention, there is shown in Figs. 20–22 an anticurl device 132 made by folding an elongated plastic strip along a pair of fold lines located inwardly of its side edges, so that the anticurl device 132 has a pair of layers 133 and 134 located in side by side relation and overlying a third layer 135, the layers being connected together at the folds 136 and 137. Fig. 21 shows a transverse section of the device at a region where the folds 136 and 137 are not eliminated, while Fig. 22 shows a transverse section of the anticurl device at a region where the folds 136 and 137 are eliminated either by being cut away or slitted, and as is evident from Fig. 22 at this region, which forms the upper end 138 of the anticurl device 132, the latter has overlying end portions which are completely unconnected and thus separate from each other, so as to reduce the stiffness of the anticurl device at its end portion 138. The opposite end portion of the anticurl device also has a reduced stiffness resulting from the shaping of the point end of the anticurl device.

Figure 23:
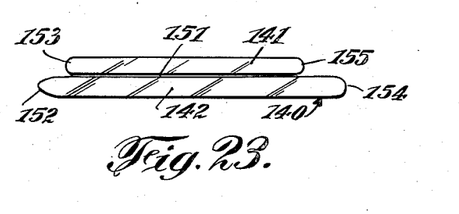
Fig. 23 is a plan view of a strip of plastic used in making still another embodiment of an anticurl device according to the present invention, the strip being shown in Fig. 23 before it assumes the final folded condition.
Figure 24:
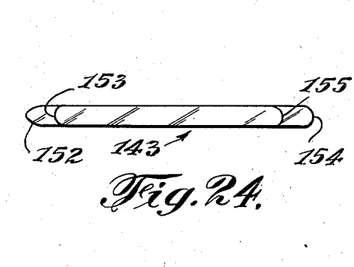
Fig. 24 shows the strip of Fig. 23 after it assumes its folded condition.

Still another embodiment of the present invention is illustrated in Figs 23 and 24 which illustrate how the stiffness may be reduced in a manner different from that shown in Figs. 13–22.

Thus, the flexibility at both ends of the stay can be increased as by providing overlying layers which are of different lengths so that one layer has one or both of its end portions extending beyond the other layer.

In Fig. 23 is shown a strip 140 of plastic before it is longitudinally folded to form the anticurl device 143 shown in Fig. 24. This strip 140 is formed with a longitudinal groove 151 so that the strip 140 is provided with layers 141 and 142 on opposite sides of the groove 151, respectively. Fig. 23 shows the ends 152 and 154 of the layer 142 which respectively extend beyond the ends 153 and 155 of the layer 141. Thus, when the strip 140 is longitudinally folded along the groove 151, so as to provide the anticurl device 143 shown in Fig. 24, the ends 152 and 154 of the layer 142 will also be completely unconnected and thus separate from the ends 153 and 155 of the layer 141 so that the stiffness is reduced at both ends of the anticurl device. The anticurl device 143 is shown in Fig. 24 ready for insertion into the collar.

Figure 25:
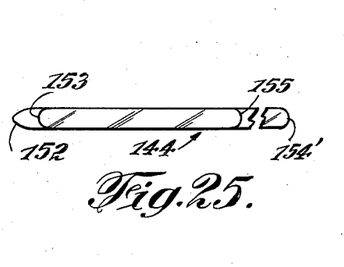
Fig. 25 is a plan view of a further embodiment of an anticurl device according to the present invention.
Figure 26:
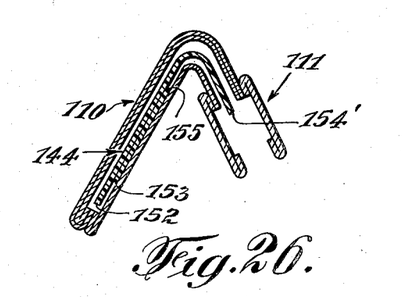
Fig. 26 is a transverse sectional view through the point region and the remainder of a collar top and through the collar band connected thereto, Fig. 26 showing the anticurl device of Fig. 25 located within the collar shown in Fig. 26.

The anticurl device 144 which is shown in Fig. 25 is identical with that of Fig. 24 except that the end 154' of the longer layer of the anticurl device is considerably longer than the end 154 of the anticurl device 143. Otherwise the anticurl devices 143 and 144 are identical. Fig. 26 shows diagrammatically the collar top 110 and the collar band 111 connected thereto, and Fig. 26 illustrates how the end 154' of the anticurl device 144 extends from the interior of the collar top 110 into the collar band 111. The pocket 113 is not shown in Fig. 26 for the sake of clarity.

It is preferred in all embodiments of the invention to fold the strips longitudinally in a direction which locates the grooves, along which the strips are folded, at the exterior surface of the folded strips, as indicated in the drawings.

Figure 27:
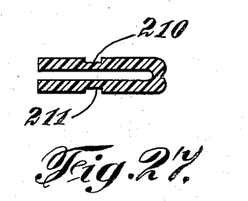
Fig. 27 is a transverse sectional view of a modified stay according to the present invention.
Figure 28:
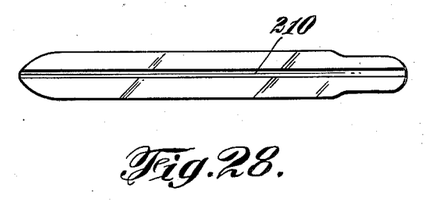
Fig. 28 is a top plan view of the stay of Fig. 27.

It has been customary to provide pockets in the collars of the shirts to receive these permanently installed stays, but it is more economical practice to stitch such stays in place, e.g. by sewing them to the bottom ply of the collar or the bottom face of the lining ply of the collar, as a first operation in collar making. The possibility of doing this is disclosed in my patent application No. 539,220, now Patent No. 2,884,640, granted May 5, 1959, Fig. 3, where the plastic is shown grooved to facilitate the stitching. This practice of stitching the stays in place instead of inserting them into a pocket is very desirable because of its low cost. However, there is an important disadvantage to the stitching in place of a plain Mylar stay, namely that in stitching, burrs are created in the plastic, and these burrs, plus the stitch itself, are very likely to show up on the surface of the collar, even though one or more plies of lining intervene between the top ply of the collar and said stitch and/or burrs. This disadvantage is very largely overcome by the groove shown in Fig. 3 of patent application Serial No. 539,220. In order to apply these ideas to the folded structure of the present invention, for sewing-in purposes it is desirable to provide the stay shown in Fig. 27, for example with at least one of the two grooves 210, 211 shown in cross section in Fig. 27, these grooves preferably running longitudinally for the whole length of the stay as shown in plan view in Fig. 28. For 5 mil Mylar a suitable depth of groove is 2 or 2½ mils; a suitable width for the groove is 45 to 50 mils.

Figure 29:
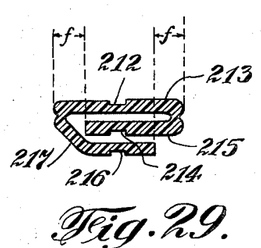
Fig. 29 is a transverse sectional view of a further embodiment of a stay according to the present invention.
Figure 30:
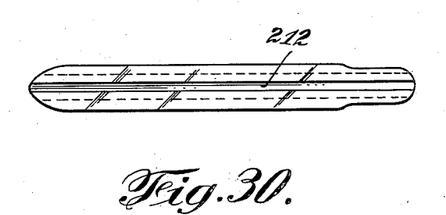
Fig. 30 is a top plan view of the stay of Fig. 29.

Still another modification is shown in cross section in Fig. 29 and in plan view in Fig. 30. Grooves are provided as shown at 212 in the central portion 213, at 214 as shown in wing 215, and at 216 in the other wing 217. It is not necessary to use all three grooves shown. For some purposes a single groove, e.g., the groove 212 may be sufficient; for other purposes, two grooves, e.g. 212 and 216 are adequate; and in still other cases all three grooves are preferred.

Figure 31:
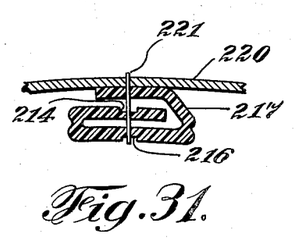
Fig. 31 is a transverse sectional view indicating how a stay of the type shown in Figs. 27–30 is connected in a garment such as a shirt to a collar ply thereof.

In Fig. 29 the length of the wings is carefully chosen so that each of the folds 215 and 217 overhang the thicker central portion where all three layers overlap. This overhang, labeled "f," is preferably made at least five times the thickness of the two layers comprising the overhanging portion. For example, the stay may be made of 5 mil Mylar so that the general thickness of the overhanging portion will be 10 mils, with a slightly greater thickness at the fold; the width of the stay may be ¼" and the width of each wing ⅜₆", so that the width of each overhanging portion will be ⅟₁₆", or approximately 0.060. This is six times the combined general thickness of 10 mils and the overhanging portion. The form shown in Figs. 29 and 30 has the advantage of the increased stiffness conferred by two folds and of minimizing the tendency to show through on the surface of the collar after ironing by having a "tapered" cross section, i.e., a central portion which is 15 mils thick (if 5 mil plastic is used) and two overhanging portions of essentially 10 mils thickness. Finally, any tendency for the folded portions of wings 215 and 217 to open up is eliminated by the central stitch by which the stay is sewn to a collar ply. Fig. 31 is a cross section of a stay of the form shown in Figs. 29 and 30 sewn to the lining ply 220 of a collar (before said ply is assembled into the collar) by the single central stitch 221. The stitch 221 overcomes any tendency that might develop for the wings to unfold. It may also cause a slight bending of the cross section as shown highly exaggerated in Fig. 31 particularly if one of the grooves, such as groove 216, is omitted.

According to the above-described structure of the invention, the longitudinally folded stays are flat. For many purposes, even for the wing portions of shirt collars, a flat stay is not altogether desirable. Instead, a curved stay would be highly advantageous, since such a stay would produce a suitable curvature of the collar with which the stay is associated. Such a curvature is of even greater importance in brassieres and girdles. Such curved stays have been very successfully manufactured in the form shown in U.S. Patent 2,601,035, for example, in which the curvature is obtained by sewing to a plastic member a stretched rubber member whose tension is varied along the length of the stay in such a manner and to such an extent as to produce the desired curvature in the final composite stay. Other attempts have been made to produce such curvature, for example, by heating and shaping the plastic, but curvatures induced in this way are not permanent. Thus, after a few washings and ironings, the curvature induced in the stay in the forming process practically disappears.

According to the present invention there is provided a stay which will reliably retain the desired curvature characteristics, and this result is achieved by making longitudinally folded stays similar to those described above. However, instead of making the fold lines straight, these fold lines are curved. The shape of these curved grooves which form the fold lines determines the manner and extent to which the finished stay will curve after it is folded, and the depth of the groove will determine the stiffness.

Figures 32, 33, 34, 35:
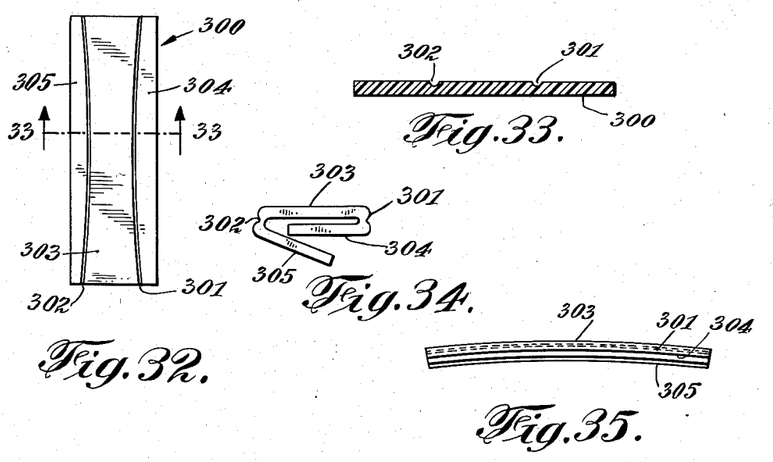
Fig. 32 is a plan view of another embodiment of a stay according to the present invention, the stay of Fig. 32 being shown in unfolded, flat condition.
Fig. 33 is a transverse sectional view taken along line 33—33 of Fig. 32 in the direction of the arrows.
Fig. 34 is an end view of the stay of Fig. 32 after it has been folded.
Fig. 35 is a side elevational view of the stay of Figs. 32–34 after the stay has been folded from the condition shown in Fig. 32 to that shown in Figs. 34 and 35.
Figure 36:
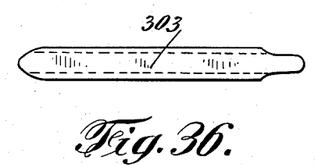
Fig. 36 is a top plan view of the stay of Fig. 35.

Referring now to Fig. 32, there is shown therein an elongated substantially rectangular strip 300 of plastic material which, for use in launderable articles like shirt collars, is preferably made of Mylar. The length of the strip 300 is chosen to suit the garment part with which it is eventually to be associated. A pair of fold lines are formed in the top face of the strip 300, as viewed in Fig. 32, and these fold lines are suitably scored in this top face so as to provide the latter with a pair of folding grooves 301 and 302, and it will be noted from Fig. 32 that these grooves are curved. These folding grooves are shown in cross section in Fig. 33. The direction of curvature of the folding grooves 301 and 302 is chosen so that the folded strip will curve in a desired manner. With curved folding grooves as shown in Fig. 32, the curvature of the finished stay will be convex upward, as viewed in Fig. 32, when the wings on either side of the curved lines are folded downwardly, as viewed in Fig. 32. Thus, it will be seen that the pair of fold lines 301 and 302 define between themselves an elongated area 303 on the top face of the strip 300, as viewed in Fig. 32, and this area 303 has a substantially hour-glass configuration. The areas 304 and 305 are respectively located at the opposite sides of the area 303 and separated therefrom by curved fold lines 301 and 302, respectively. When this strip is folded in the manner described above, the areas 304 and 305 will be directed away from the area 303, as shown in Fig. 34, and furthermore when folded in this way the strip will assume a curvature indicated in Fig. 35 from which it may be seen that the area 303 is convexly curved. As may be seen from Fig. 36, the ends of the stay may be cut away in the manner indicated in Fig. 36 so that the elongated stay has a configuration similar to the stays described above, the difference being that the stay of Figs. 32–36 assumes a longitudinal curvature due to the fold thereof along the curved fold lines 301 and 302. For most purposes it is desirable to have a pair of curved fold lines as indicated in Fig. 32. However, for some purposes it is sufficient to have only one curved fold line, and such a construction is illustrated in Figs. 39–41.

Figures 39, 41, 43, 44:
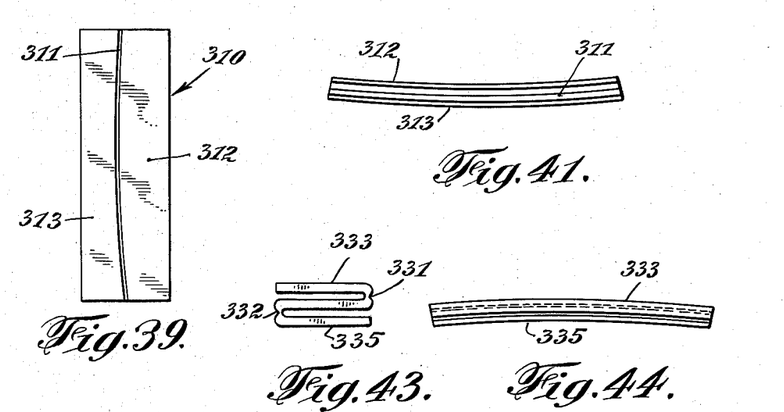
Fig. 39 is a plan view of still another embodiment of a stay according to the present invention.
Fig. 41 is a side elevational view of the stay of Figs. 39 and 40, the stay being shown in folded condition in Fig. 41.
Fig. 43 is an end view of the stay of Fig. 42 after it has been folded.
Fig. 44 is a side elevational view of the folded stay of Fig. 43.
Figures 40, 42, 45, 46:
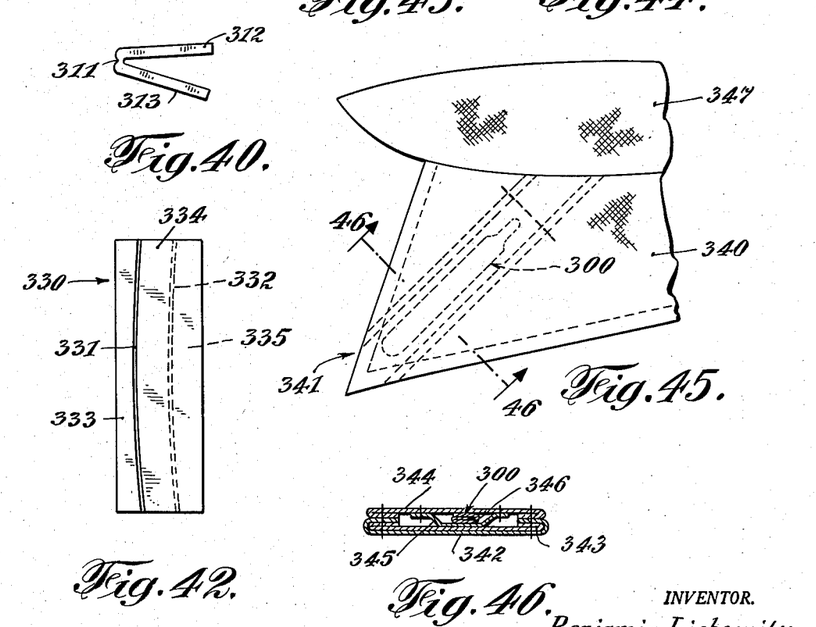
Fig. 40 is an end view of the stay of Fig. 39 after it has been folded.
Fig 42 is a top plan view of still another embodiment of a stay according to the present invention, the stay being shown in Fig. 42 in flat, unfolded condition
Fig. 45 shows a collar wing provided with a stay of the present invention, this stay being, for example, the stay illustrated in Figs. 34–36.
Fig. 46 is a transverse sectional view taken along line 46—46 of Fig. 45 in the direction of the arrows and showing how the stay is situated in a collar pocket.

Referring now to Figs. 39–41, it will be seen that the elongated plastic strip 310 is formed in its top face, as viewed in Fig. 39, with an elongated curved groove 311 forming a fold line for the strip. Thus, the line 311 divides the area of the top face of the strip 310 into a pair of areas 312 and 313 separated from each other by the curved fold line 311. When this strip 310 is longitudinally folded along the curved fold line 311 in a manner which will locate the areas 312 and 313 in a position where they are directed away from each other, as indicated in Fig. 40, then the longitudinally folded strip will assume the curvature shown in Fig. 41. It will be noted that the area 312 shown in Fig. 39 terminates in a convex edge at the fold line 311 while the area 313 terminates at the fold line 311 in a concave edge. When the strip 310 is longitudinally folded in the manner described above, the strip portion which includes the area 312 will become curved so that the surface 312 is concave and the strip portion which includes the area 313 will become curved so that the area 313 is convex, in the manner shown in Fig. 41, and thus the folding of the strip 310 along the curved line 311 will provide a curved stay as indicated in Fig. 41.

It will be understood that amount of curvature of the finished stay will depend on the curvature of the grooves which determine the fold lines. Where the fold lines run straight, the folded strip will be straight, as is evident from the description above. Moreover, if only a part of the fold line is straight, then the portion of the strip folded along the straight portion of the fold line will also be straight, as will be apparent from the description below in connection with Fig. 49. The curvature is thus confined to those regions where the fold lines are curved. The extent of curvature of the fold lines and the distribution thereof along the strip may be varied over a very wide range. For example, where only a gentle curvature is required, the radius of curvature of each of the folding grooves may be on the order of 25", or even much more, for example, several times that radius. Where a larger curvature of the finished stay is desired, the radius of curvature of the grooves may be much less than 25", for example, a radius on the order of 15" would be suitable for some purposes while a radius on the order of 8" would be suitable for other purposes. It is understood that these sizes are purely by way of example, and the invention is not to be construed as in any way limited to any particular radii for the curved fold line.

In the same way, the thickness and composition of the plastic used for the stay may vary over a very wide range. Mylar has a much larger coefficient of elasticity than most other plastics, but Mylar is referred to as illustrative of the invention with the understanding that the thickness which might be used will depend on the plastic used as well as the purpose for which the stay is intended. By way of illustration, a convenient and suitable thickness for stays longitudinally folded along curved fold lines and used in men's shirts would be about 5 mils. However, for delicate fabrics a lighter gauge may be chosen such as, for example 3 mils, and for heavy sport shirts or sport jackets and other outer wear, and for use in brassieres or girdles, a thickness of 7½ or even 10 mils may be suitable. These thicknesses are purely illustrative and are not to be construed as limiting the invention.

Figure 37:
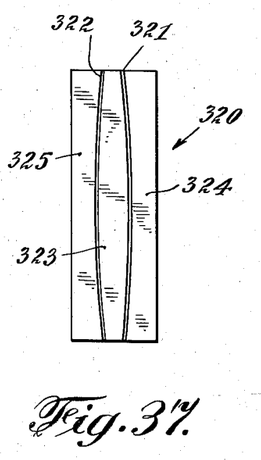
Fig. 37 is a plan view of another embodiment of a stay according to the present invention, the stay of Fig. 37 also being shown in flat unfolded conditions.
Figure 38:
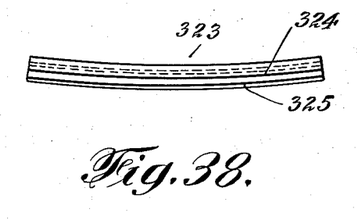
Fig. 38 is a side elevational view of the stay of Fig. 37 after it has been longitudinally folded.

The curved fold lines according to the present invention need not necessarily take the form shown in Figs. 32–36 and 39 and 40. For example, in Fig. 37 the elongated strip 320 is provided with a pair of oppositely curved fold lines 322 and 321 which are oppositely curved with respect to each other and which are curved oppositely to the curves 302 and 301 respectively. Thus, the elongated curved grooves 321 and 322 shown in the top face of the strip 323 of the Fig. 37 will define between themselves an area 323 of this top face which has the configuration of part of an ellipse, and this top face will have outer areas 324 and 325 separated from the intermediate area 323 by the curved fold lines 321 and 322. When the outer sides of Fig. 37 are folded downwardly along the fold lines 321 and 322 beneath the intermediate portion of the strip, so that in cross section the folded strip will appear as indicated in Fig. 34, then the folded strip will have the curvature shown in Fig. 38 where the area 323 and the strip portion of which it forms a part will be curved as shown in Fig. 38 with this area 323 being concave. In this way, the strip of Figs. 37 and 38 is provided with a curvature opposite to that shown in Fig. 35. In Fig. 42 the strip 330 is provided in its top face with an elongated curved folding groove 331 formed by a suitable scoring instrument, and the strip is formed in its bottom face with an elongated folding groove 332 which is parallel to the folding groove 331 and laterally spaced therefrom. Thus, the strip 330 will have between the folding lines 331 and 332 an intermediate longitudinal portion 334, and it will have an area 333 to the left of the fold line 331, as viewed in Fig. 42, and an area 335 at its bottom face to the right of the fold line 332, as viewed in Fig. 42. This strip shown in Fig. 42 is folded along the fold lines 331 and 332 so as to have the substantially S-shaped sectional configuration indicated in Fig. 43, and it is folded in such a way that the area 333 is exposed at the top of the strip and the area 335 is exposed at the bottom of the strip. When the strip is folded in this way the area 333 will assume a convex curvature and the area 335 will assume a concave curvature, and the entire strip will be curved in the manner shown in Fig. 44.

Figs. 45 and 46 show the longitudinally folded strip 300 of Figs. 32–36 located in a shirt collar 340. This shirt collar 340 includes a wing portion 341. As may be seen from Fig. 46, the collar has a front or outer ply 342 and a back ply 344, with an intermediate ply 343 located next to the front ply 342. A strip of fabric 345 is stitched along its outer side edges to the inner surface of the back ply 344 so as to form with the latter the pocket 346 before the plies are attached to each other along the edges of the collar 340. Before the collar 340 is attached to the collar band 347, the longitudinally folded device of Figs. 32–36 is inserted into the pocket 346, and it will be noted from Fig. 46 that this longitudinally folded device is inserted so that the convexly curved surface 303 is directed toward the front ply 342. This surface 303 is smooth so that there will be no edges showing through the front ply of the collar. Moreover, the pocket 346 is made of such a size that the device of Figs. 32–36 has a relatively snug, tight fit in the pocket, and thus the pocket itself holds the folded strip portions against each other in folded condition and resists any tendency of these strip portions to move apart from each other to a position somewhat as indicated in Fig. 34, and in this way the maintenance of the desired curvature is guaranteed. After the folded stay 300 is located in the pocket 346, the collar 340 is joined to the collarband 347 in a conventional manner and the stay is permanently enclosed in the pocket 346 of the collar. Of course, the other wing of the collar is constructed in the same way, and this curved stay which is composed only of the single sheet of plastic material will tend to curve the point of the collar inwardly toward the body of the wearer and at the same time will retain its curvature after repeated launderings and ironings.

Figure 47:
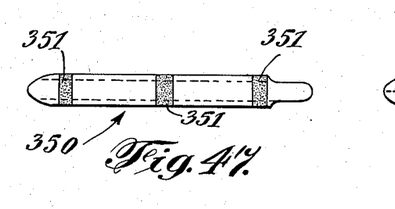
Fig. 47 shows one manner of interconnecting the overlying layers of a stay after it has been longitudinally folded.

It is not essential to rely upon the snug fit of the device in a pocket for holding the overlying portions thereof next to each other. For example, as is shown in Fig. 47, a stay 350 may be provided having the construction of any of the above described stays shown in Figs. 32–44 and this stay has its overlying portions joined to each other by fusing along the localized areas 351 indicated in Fig. 47, for example. Such localized fusing of the overlying strip portions to each other in order to maintain the longitudinally folded stay in its curved condition may be brought about by any suitable heated tool. Also the overlying portions of the stay may be held together at localized areas by a suitable adhesive.

Figure 48:
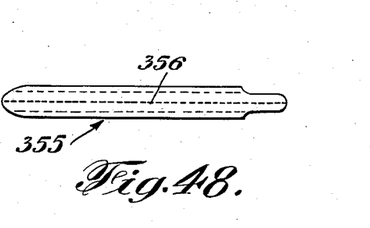
Fig. 48 shows another embodiment of a structure for interconnecting the overlying portions of a folded stay.

Fig. 48 shows another arrangement where the stay 355 has its overlying strip portions held together by a longitudinally extending relatively loose stitch 356 which passes through all of the overlying strip portions and resists a tendency of these strip portions to move apart from each other. The stay 355 thus will retain its own curvature very reliably as a result of the stitches 356, and such a stay may be located in any pocket even with a rather loose fit. It should also be noted that a stay such as that shown in Fig. 48 may be directly sewn to a collar ply or to any other garment with which the device is to be associated, and the stitches used for sewing the stay to the garment may also be used for holding the overlying strip portions close to each other. Although the stay 300 is shown in folded condition in Fig. 45 extending diagonally of the collar wing 341, other positions of the collar stay nearer to the edges of the collar may be provided, if desired.

Figure 49:
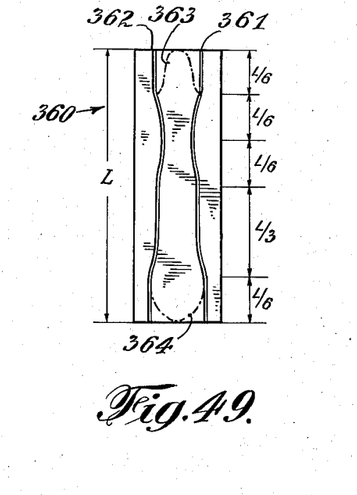
Fig. 49 is a top plan view of a flat, unfolded stay provided with fold lines curved in a very special way so as to provide the stay with a non-uniform curvature particularly suited for shirt collars after the stay has been folded along the fold lines.

A stay which will have its own curvature and which will induce a desired curving tendency in a collar is shown in Fig. 49, and this device of Fig. 49 is particularly suitable for shirt collars where it is desired to have the maximum curving force relatively distant from the point of the collar and nearer to the collarband 347 than the outer tip of the wing 341.

Figure 50:
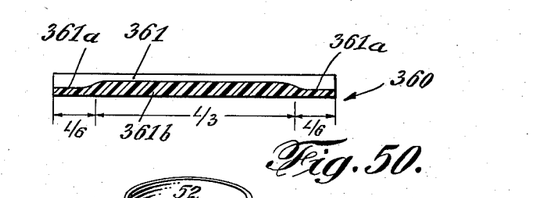
Fig. 50 is a longitudinal sectional view of the structure of Fig. 49 taken along one of the fold lines shown in Fig. 49.

Referring to Fig. 49 there is shown therein an elongated strip 360 of Mylar having a length L and formed in its top face, as viewed in Fig. 49 with a pair of longitudinally extending fold lines 361 and 362. Starting at the top of the strip 360, as viewed in Fig. 49, it will be seen that for a length of approximately ⅙ of the strip the fold lines 361 and 362 are straight and parallel to each other. From a distance of approximately ⅙ from the top end of this strip, as viewed in Fig. 49 to approximately midway between the ends of the strip the fold lines 361 and 362 are curved along a pair of symmetrical curves, and the maximum curvature is provided at approximately ⅓ of the way from the top end of the strip, as viewed in Fig. 49. The fold lines 361 and 362 are also straight next to the bottom end of the strip, as viewed in Fig. 49 for approximately a length of ⅙ of the strip, and from a distance of approximately ⅙ of the length of the strip from the bottom end thereof, as viewed in Fig. 49, to a point substantially mid-way between the ends of the strip the fold lines 361 and 362 are curved along a pair of symmetrical curves which have a lesser degree of curvature than the curves extending along the portion of the strip between the center thereof and the point ⅙ of the way from the top end of the strip, as viewed in Fig. 49. Therefore, when the strip 360 of Fig. 49 is folded in the same way as the strip 300 of Fig. 32, along the fold lines 361 and 362, the longitudinally folded strip will curve in the same general direction as the strip shown in Fig. 35, but it will have a maximum curvature approximately ⅓ of the way from the top end of the strip shown in Fig. 49, and then the degree of curvature will be less, there being substantially no curvature at the end portions of the strip because the fold lines are straight at these end portions. As may be seen from Fig. 50, when the strip 360 is scored so as to be provided with the fold lines extending along the grooves 361 and 362, these grooves are made deeper at their end portions where they are straight and parallel to each other. Thus, as may be seen from Fig. 50 where the groove 361 is illustrated, the end portions 361a of the groove are deeper than the intermediate elongated portion 361b thereof. The groove 361 is curved along its intermediate portion 361b while it is straight at the portions 361a, and the groove 362 is constructed in the same way. Thus, there will be less resistance to folding of the stay along the straight end portions of the fold lines, and as a result the end portions will easily lie flat against each other. If desired, the ends of the folded strip may be trimmed in the manner indicated by the dot-dash lines 363 and 364 shown in Fig. 49 so as to have the configuration indicated, for example, in Fig. 36, and in this way the free ends of the overlying strip portions are not connected to each other so that there is no tendency to curve the garment at these free ends of the stay, as described above.

Figure 51:
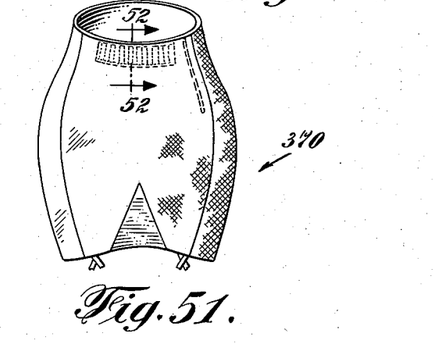
Fig. 51 is a perspective view of a girdle provided with a stay such as that shown in Fig. 38.
Figures 52, 54:
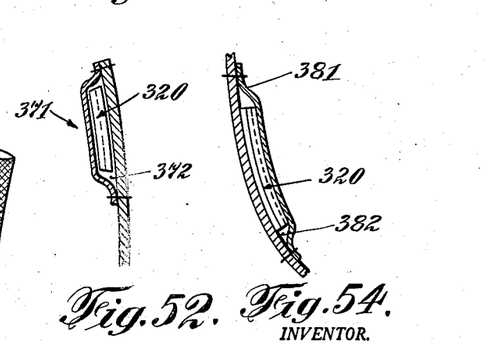
Fig. 52 is a fragmentary sectional view taken along line 52—52 of Fig. 51 in the drection of the arrows.
Fig. 54 is a fragemntary sectional view taken along line 54—54 of Fig. 53 in the direction of the arrows.

Referring now to Figs. 51 and 52, there is shown therein a girdle 370 having a front upper edge portion provided with an inner surface directed toward the abdomen of the wearer when the girdle is worn, and a sheet of fabric 371 is sewn to the inner surface of the upper front edge portion of the girdle with a series of stitches providing a plurality of vertically extending pockets 372 located in side by side relation, and a plurality of the folded strips 320 of Figs. 37 and 38 are located in these pockets with the surface 323 directed towards the body of the wearer, so that the upper front edge portion of the girdle will have a curvature induced therein in the manner indicated in Fig. 52 to resist any tendency of the front upper edge of the girdle to roll over. By using the longitudinally folded device of Figs. 37 and 38 the smooth surface 323 is directed toward the body to eliminate any discomfort while at the same time providing the desired curving tendency in the garment.

Figure 53:
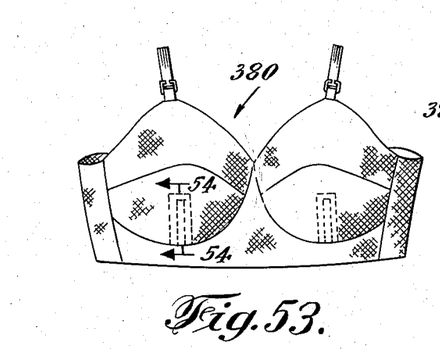
Fig. 53 illustrates a brassiere provided with the structure of the invention such as the stay of Figure 38.

Figs. 53 and 54 illustrate the structure of the invention incorporated into a brassiere 380. A fabric section 381 is stitched to the inner surface of each of the cups of the brassiere 380 in the manner indicated in Figs. 53 and 54 so as to provide in each of these cups a pocket 382, and in this case also the longitudinally folded strip 320 of Figs. 37 and 38 is located in each of these pockets 382 with the curved surface 323 directed toward the body of the wearer, so that in this case also the desired curving tendency is induced in the garment with a minimum of discomfort to the wearer.

Of course, with the girdle of Fig. 51 or the brassiere of Fig. 53 the anticurl device may be directly sewn to the garments rather than located in a pocket thereof. Where the devices are directly sewn to the garment the stitches may be used to oppose any tendency of the overlying strip portions to move apart from each other, and where they are located in a pocket of the anticurl devices may have a snug fit in these pockets so that the pockets themselves resist a tendency of the overlying strip portions to move apart from each other. Also, the overlying strip portions may, if desired, be fused together at localized areas as shown in Fig. 47 and described above, so that in this way there will be no tendency of the overlying strip portions to move apart from each other.

Of course, the unbanded collars of sport shirts may be provided with the stays of the invention.

A particular advantage of using the stays of the invention in girdles and brassieres is that the operator of the sewing machine can freely run stitches across the stays. Heretofore, it has been necessary to stop the stitches at the stays, so that the operator had to exercise greater care and take more time in the sewing.

I claim:

1. An anticurl device for garments and garment parts comprising a thin strip of a solid non-woven plastic material selected from the group consisting of mylar-type and nylon-type substances, said solid, non-woven plastic strip including at least two elongated strip portions and being folded longitudinally along a fold located between said strip portions with the inner faces of said strip portions being spaced apart from each other at least in the region of said fold.

2. An anticurl device as recited in claim 1, said strip being formed with a groove extending along said fold and located at the exterior of the folded strip.

3. An anticurl device according to claim 1 and wherein at least one end of said strip portions are completely unconnected and thus separate from each other so that the anticurl device has substantially less flexural stiffness at said one end than in the region where said strip portions are connected to each other along said fold.

4. An anticurl device as recited in claim 1 and wherein the folded strip has less flexural stiffness at one end portion thereof than along an intermediate portion.

5. An anticurl device according to claim 1 and wherein the outer face of at least one strip portion is formed with a longitudinal stitch-receiving groove.

References Cited in the file of this patent

UNITED STATES PATENTS

| | | |
|---|---|---|
| 946,844 | Keats | Jan. 18, 1910 |
| 1,081,724 | De Smith | Dec. 16, 1913 |
| 1,326,322 | Chandler | Dec. 30, 1919 |
| 1,427,727 | Fairless | Aug. 29, 1922 |
| 1,813,304 | Lind et al. | July 7, 1931 |
| 1,969,928 | Haven | Aug. 14, 1934 |
| 2,048,238 | Weeks | July 21, 1936 |
| 2,316,018 | Plummer | Apr. 6, 1943 |
| 2,601,037 | Liebowitz | June 17, 1952 |
| 2,630,949 | Steele | Mar. 10, 1953 |
| 2,697,834 | Robinson | Dec. 28, 1954 |
| 2,701,880 | Sucher | Feb. 15, 1955 |
| 2,724,836 | Wiedemeyer | Nov. 29, 1955 |
| 2,769,979 | Driesbach | Nov. 13, 1956 |
| 2,799,024 | Oscard | July 16, 1957 |
| 2,849,719 | Loew | Sept. 2, 1958 |

FOREIGN PATENTS

| | | |
|---|---|---|
| 470,270 | Great Britain | Aug. 12, 1937 |
| 72,108 | Norway | May 19, 1947 |
| 1,111,443 | France | Oct. 26, 1955 |